United States Patent
Aoyama et al.

(10) Patent No.: US 9,647,270 B2
(45) Date of Patent: May 9, 2017

(54) BINDER FOR LITHIUM ION SECONDARY BATTERY ELECTRODE, PRODUCTION METHOD FOR LITHIUM ION SECONDARY BATTERY ELECTRODE, LITHIUM ION SECONDARY BATTERY ELECTRODE, AND LITHIUM ION SECONDARY BATTERY

(71) Applicant: THE NIPPON SYNTHETIC CHEMICAL INDUSTRY CO., LTD., Osaka (JP)

(72) Inventors: Masato Aoyama, Osaka (JP); Yasuhiro Aoki, Osaka (JP); Mitsuo Shibutani, Osaka (JP)

(73) Assignee: THE NIPPON SYNTHETIC CHEMICAL INDUSTRY CO., LTD., Osaka (JP)

( * ) Notice: Subject to any disclaimer, the term of this patent is extended or adjusted under 35 U.S.C. 154(b) by 0 days.

(21) Appl. No.: 15/058,649

(22) Filed: Mar. 2, 2016

(65) Prior Publication Data

US 2016/0181617 A1 Jun. 23, 2016

Related U.S. Application Data

(63) Continuation-in-part of application No. PCT/JP2014/073539, filed on Sep. 5, 2014.

(30) Foreign Application Priority Data

Sep. 6, 2013 (JP) .................................. 2013-184830

(51) Int. Cl.
| | | |
|---|---|---|
| *H01M 4/62* | (2006.01) | |
| *H01M 4/04* | (2006.01) | |
| *H01M 4/13* | (2010.01) | |
| *C09D 129/14* | (2006.01) | |
| *H01M 4/139* | (2010.01) | |
| *H01M 10/0525* | (2010.01) | |
| *C08F 8/28* | (2006.01) | |

(52) U.S. Cl.
CPC .......... *H01M 4/622* (2013.01); *C09D 129/14* (2013.01); *H01M 4/0404* (2013.01); *H01M 4/13* (2013.01); *H01M 4/139* (2013.01); *H01M 10/0525* (2013.01); *C08F 8/28* (2013.01); *Y02P 70/54* (2015.11)

(58) Field of Classification Search
CPC ...... H01M 4/622; H01M 4/0404; H01M 4/13; H01M 4/139; H01M 10/0525
See application file for complete search history.

(56) References Cited

FOREIGN PATENT DOCUMENTS

| | | | |
|---|---|---|---|
| JP | 2000-048806 | * | 2/2000 |
| JP | 2000-48806 A | | 2/2000 |
| JP | 2012-195289 A | | 10/2012 |
| JP | 2012-195289 | * | 11/2012 |

OTHER PUBLICATIONS

Mashita et al., "Anode Binder Resin for Lithium Ion Batteries", Hitachi Chemical Technical Report, No. 45, Jul. 2005, pp. 7-10.
International Search Report issued with respect to Application No. PCT/JP2014/073539, mail date is Oct. 28, 2014.
International Preliminary Report on Patentability issued with respect to Application No. PCT/JP2014/073539, mail date is Mar. 8, 2016.

* cited by examiner

*Primary Examiner* — Robert Harlan
(74) *Attorney, Agent, or Firm* — Greenblum & Bernstein, P.L.C.

(57) ABSTRACT

The present invention provides a binder for a lithium ion secondary battery electrode that has good adhesive properties and a low degree of swelling with respect to an electrolytic solution. There is used a binder for a lithium ion secondary battery electrode, which comprises a polyvinyl acetal-based resin (A) containing structural units represented by chemical formulae (1) to (3):

[Chem 1]

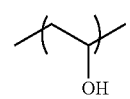

(1)

[Chem 2]

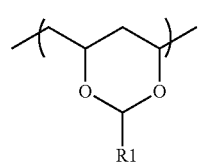

(2)

(R1 is a hydrogen atom or an alkyl group having 1 to 10 carbon atoms), and

[Chem 3]

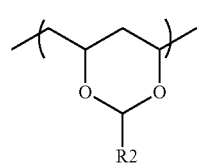

(3)

(R2 is a functional group containing an ethylenically unsaturated bond).

13 Claims, No Drawings

BINDER FOR LITHIUM ION SECONDARY BATTERY ELECTRODE, PRODUCTION METHOD FOR LITHIUM ION SECONDARY BATTERY ELECTRODE, LITHIUM ION SECONDARY BATTERY ELECTRODE, AND LITHIUM ION SECONDARY BATTERY

CLAIM FOR PRIORITY

This application is a Continuation-In-Part of PCT/JP2014/073539 filed Sep. 5, 2014, and claims the priority benefit of Japanese application 2013-184830 filed Sep. 6, 2013, the contents of which are expressly incorporated by reference herein in their entirety.

TECHNICAL FIELD

The present invention relates to a binder for a lithium ion secondary battery electrode, which contains a polyvinyl acetal-based resin, a lithium ion secondary battery electrode, a method for producing a lithium ion secondary battery electrode, and a lithium ion secondary battery. Specifically, the present invention relates to a binder for a lithium ion secondary battery electrode, which contains a polyvinyl acetal-based resin having a crosslinking group, a method for producing a lithium ion secondary battery electrode using the binder, a lithium ion secondary battery electrode containing a crosslinked product of the polyvinyl acetal-based resin, and a lithium ion secondary battery.

BACKGROUND ART

In recent years, for the purpose of mounting a lithium ion secondary battery on electric/hybrid automobiles that require large capacity, further increase in capacity and high performance of the battery are requested. As a method for solving the request, there is proposed a method of increasing the charging and discharging capacity by using silicon or tin that stores a large amount of lithium per unit volume or an alloy containing them as a negative electrode active material or by employing the same as a mixture with carbon such as conventional graphite.

However, when an active material having a large charging and discharging capacity, such as silicon or tin or an alloy containing them is used, the active material causes very large volume change resulting from charging and discharging. For the reason, in the case where a rubber-based resin such as polyvinylidene fluoride or SBR, which has been widely used in a conventional electrode that uses carbon such as graphite as an active material, is used as a binder, the resin cannot follow the very large volume change of the active material and thus exfoliation occurs at the interface between the collector and the active material layer. Therefore, there is a problem that a current-collecting structure in the electrode is destroyed, electron conductivity of the electrode decreases, and the cycle properties of the battery easily decrease.

Accordingly, there is requested a binder for a lithium ion secondary battery electrode using a binding resin component capable of following the very large volume change of the active material.

On the other hand, there is known a technology of using a polyvinyl acetal-based resin as a binding resin component in a binder for a lithium ion secondary battery electrode (for example, see Patent Document 1). Such a technology provides a composition that is excellent in adhesive properties between the electrode active material and the collector and is capable of manufacturing a lithium ion secondary battery having a high capacity by using a polyvinyl acetal-based resin in which the amount of the hydroxyl group falls within a specific range. In the document, it is described that the electrode sheet test piece obtained using the technology show a low elution rate in the case where it is allowed to stand in an electrolytic solution at room temperature for 1 hour.

However, even when the above technology is applied, since the binder in the electrode elutes into an electrolytic solution (carbonate ester-based solvent) though the amount is only little, there is a problem in the case of using the battery stably over a long period of time. Moreover, since the degree of swelling of the binder with respect to the electrolytic solution is high, there is a problem of a decrease in discharging capacity retention upon a charging and discharging cycle (see Non-Patent Document 1).

Furthermore, in the electrode using the polyvinyl acetal-based resin as a binder, the binder swollen with the electrolytic solution can stretch following the expansion of the electrode active material but there is a problem that the binder cannot follow the contraction of the electrode active material at the time of discharging.

Therefore, strain is generated and increased between the binder and the electrode active material upon repeated charging and discharging and, as a result, there is a concern that the electrode is exfoliated from the collector owing to breakage of the binder and exfoliation of the active material from the binding resin component, so that there is a problem that a lithium ion secondary battery having a good performance cannot be obtained.

Accordingly, there is requested a resin, as a binder in the electrode, that has a low degree of elution and a low degree of swelling with respect to a carbonate-based electrolytic solution, contracts to the state before stress application when stress is removed after the stress is applied from the electrode active material and the resin is stretched, and can continue to follow the electrode active material even when the expansion and the contraction are repeated.

Moreover, there is known a technology of covering the electrode active material of a lithium ion secondary battery with a crosslinked product of a polyvinyl acetal-based resin (for example, see Patent Document 2). In such a technology, the active material is covered with the crosslinked product of the polyvinyl acetal-based resin for improving the adhesive force between the active material and the binder (binding agent) and suppressing the collapse of the active material, and it is inevitable to use a binder for the active material of the lithium ion secondary battery electrode in combination. However, in the technology, the crosslinked product of the polyvinyl acetal-based resin is only used as a covering agent of the active material and the binder is a conventionally used resin such as polytetrafluoroethylene, a rubber-based resin composed of ethylene-propylene-diene rubber or a styrene-butadiene copolymer, or a polyester amide, so that there are the same problems as described above.

BACKGROUND ART DOCUMENTS

Patent Documents

Patent Document 1: JP-A-2012-195289
Patent Document 2: JP-A-2000-48806

Non-Patent Document

Non-Patent Document 1: Hitachi Chemical Technical Report No. 45 (July, 2005) p 7-10.

SUMMARY OF INVENTION

Problems that the Invention is to Solve

The present invention is made in consideration of such circumstances and an object thereof is to provide a binder for a lithium ion secondary battery electrode, which has a low degree of elution and a low degree of swelling with respect to a carbonate ester-based electrolytic solution, is capable of expansion or contraction following the application or removal of stress, and can continue to follow the electrode active material even when the expansion and contraction are repeated.

Means for Solving the Problems

As a result of extensive studies, the present inventors have found that the object of the invention is achieved by the use of a polyvinyl acetal-based resin containing a crosslinking group introduced thereinto as a binder.

More specifically, the present invention relates to the following [1] to [12].

[1] A binder for a lithium ion secondary battery electrode, which comprises a polyvinyl acetal-based resin (A) containing structural units represented by chemical formulae (1) to (3):

[Chem 1]

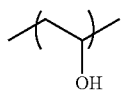
(1)

[Chem 2]

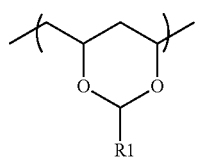
(2)

wherein R1 is a hydrogen atom or an alkyl group having 1 to 10 carbon atoms, and

[Chem 3]

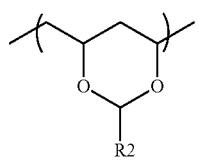
(3)

wherein R2 is a functional group containing an ethylenically unsaturated bond.

[2] The binder for a lithium ion secondary battery electrode according to [1], wherein, in the polyvinyl acetal-based resin (A), the degree of acetalization of the structural unit represented by the formula (2) is from 10 to 40% by mol.

[3] The binder for a lithium ion secondary battery electrode according to [1] or [2], wherein, in the polyvinyl acetal-based resin (A), the degree of crosslinking group modification of the structural unit represented by the formula (3) is from 0.1 to 15% by mol.

[4] The binder for a lithium ion secondary battery electrode according to any one of [1] to [3], wherein, in the polyvinyl acetal-based resin (A), the content of the structural unit represented by the formula (1) is from 45 to 89.9% by mol.

[5] The binder for a lithium ion secondary battery electrode according to any one of [1] to [4], wherein the average degree of polymerization of the polyvinyl acetal-based resin (A) is 1,500 or more.

[6] The binder for a lithium ion secondary battery electrode according to any one of [1] to [5], which contains a solvent (B).

[7] The binder for a lithium ion secondary battery electrode according to any one of [1] to [6], which contains a polymerization initiator (C).

[8] A method for producing a lithium ion secondary battery electrode, which comprises forming an electrode on a collector using the binder for a lithium ion secondary battery electrode according to any one of [1] to [7] and crosslinking the polyvinyl acetal-based resin (A) by heat or light.

[9] A lithium ion secondary battery electrode comprising the binder for a lithium ion secondary battery electrode according to any one of [1] to [7] and an active material.

[10] The lithium ion secondary battery electrode according to [9], wherein the polyvinyl acetal-based resin (A) contained in the binder for a lithium ion secondary battery electrode is from 0.1 to 10 parts by weight based on 100 parts by weight of the active material.

[11] A lithium ion secondary battery electrode comprising a crosslinked product of a polyvinyl acetal-based resin (A) containing structural units represented by chemical formulae (1) to (3):

[Chem 4]

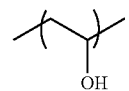
(1)

[Chem 5]

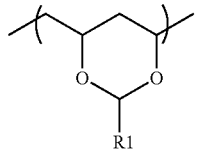
(2)

wherein R1 is a hydrogen atom or an alkyl group having 1 to 10 carbon atoms, and

[Chem 6]

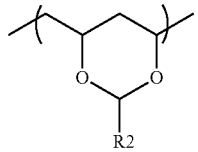
(3)

wherein R2 is a functional group containing an ethylenically unsaturated bond.

[12] A lithium ion secondary battery having the lithium ion secondary battery electrode according to any one of [9] to [11].

Effects of the Invention

As described above, the binder in the electrode obtained by the use of a polyvinyl acetal-based resin (A) having a crosslinking group as a binder is a resin in which the polyvinyl acetal-based resin (A) is crosslinked. Such a crosslinked binder has an advantage that the degree of elution and the degree of swelling are low with respect to a carbonate ester-based electrolytic solution. Furthermore, the binder can expand or contract following the application or removal of stress derived from an electrode active material. Moreover, it is possible to continue to follow the electrode active material even when the expansion and contraction are repeated.

In addition, since the elastic modulus is high even in a state swollen with an electrolytic solution, deformation of the whole electrode layer can be made small when particles of the active material are expanded or contracted by charging or discharging and thus the contact state between the active materials each other and the contact state between the active material and the collector can be satisfactorily maintained. Therefore, the binder has an effect that initial charging and discharging efficiency and charging and discharging cycle properties can be improved.

EMBODIMENTS FOR CARRYING OUT THE INVENTION

The explanation of constitutional requirements to be described below is one example (representative example) of embodiments of the invention and is not specifically limited to these contents.

The present invention relates to a binder for a lithium ion secondary battery electrode, which comprises a polyvinyl acetal-based resin (A) containing structural units represented by following chemical formulae (1) to (3):

[Chem 7]

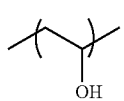
(1)

[Chem 8]

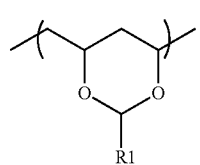
(2)

wherein R1 is a hydrogen atom or an alkyl group having 1 to 10 carbon atoms, and

[Chem 9]

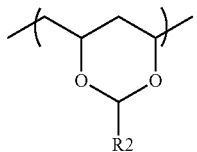
(3)

wherein R2 is a functional group containing an ethylenically unsaturated bond.

<Explanation of (A) Polyvinyl Acetal-Based Resin>

The chemical formula (1) in the polyvinyl acetal-based resin (A) represents a vinyl alcohol structural unit. Such a structural unit is usually derived from a vinyl alcohol-based resin that is a precursor of the polyvinyl acetal-based resin.

[Chem 10]

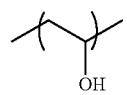
(1)

The content of the structural unit represented by the chemical formula (1) (hereinafter sometimes referred to as structural unit (1)) in the polyvinyl acetal-based resin (A) is usually from 45 to 89.9% by mol. The content of the structural unit (1) is more preferably from 50 to 85% by mol and particularly preferably from 60 to 80% by mol. In the case where the content of the structural unit (1) falls within the above range, the effects of the invention tend to be efficiently obtained.

The chemical formula (2) in the polyvinyl acetal-based resin (A) represents an acetal structural unit. Such a structural unit is usually obtained by acetalization of a vinyl alcohol-based resin using an aldehyde compound.

[Chem 11]

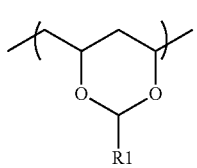
(2)

(in the formula (2), R1 is a hydrogen atom or an alkyl group having 1 to 10 carbon atoms).

In the chemical formula (2), R1 is a hydrogen atom or an alkyl group having 1 to 10 carbon atoms, preferably a hydrogen atom or an alkyl group having 1 to 5 carbon atoms, and particularly preferably an alkyl group having 1 to 5 carbon atoms.

Since R1 is a functional group derived from the aldehyde compound, it is possible to adjust R1 by selecting the aldehyde compound to be used. As the aldehyde compound, there may be mentioned formaldehyde (R1 is hydrogen), acetaldehyde (R1 is an alkyl group having 1 carbon atom), butyraldehyde (R1 is an alkyl group having 3 carbon atoms), pentyl aldehyde (R1 is an alkyl group having 4 carbon atoms), decane aldehyde (R1 is an alkyl group having 9 carbon atoms), and the like.

The content of the structural unit represented by the chemical formula (2) (hereinafter sometimes referred to as structural unit (2)) in the polyvinyl acetal-based resin (A) is based on the number of hydroxyl groups in the vinyl alcohol-based resin that is a precursor of the polyvinyl acetal-based resin and means a ratio of the number of hydroxyl groups acetalized with the aldehyde compound (such a ratio is referred to as "degree of acetalization"). That is, as a calculation method of the degree of acetalization, a method of counting the number of hydroxyl groups subjected to acetalization is adopted and mol percent of the degree of acetalization is calculated.

The degree of acetalization of the structural unit (2) in the polyvinyl acetal-based resin (A) is usually from 10 to 40% by mol. The degree of acetalization of the structural unit (2) is more preferably from 10 to 30% by mol and particularly preferably from 15 to 20% by mol. In the case where the degree of acetalization is too high, there is a tendency that the degree of elution and the degree of swelling with respect to an electrolytic solution increase and, in the case where it is too low, the effects of the invention tends to be difficult to obtained.

The chemical formula (3) in the polyvinyl acetal-based resin (A) represents a crosslinking group structural unit. Such a structural unit is usually obtained by acetalization of vinyl alcohol using an aldehyde compound having a functional group containing an ethylenically unsaturated bond.

[Chem 12]

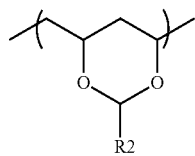

(3)

(in the formula (3), R2 is a functional group containing an ethylenically unsaturated bond).

In the chemical formula (3), R2 is a functional group containing an ethylenically unsaturated bond. When such a functional group contains an ethylenically unsaturated bond, crosslinking is achieved by performing a crosslinking reaction to be mentioned later to afford a resin having a reticulated structure.

Such an ethylenically unsaturated bond is preferably at least one selected from terminal vinyl structures and internal alkene structures, and as the functional group containing an ethylenically unsaturated bond, there may be mentioned alkyl groups containing a terminal vinyl structure, alkyl groups containing an internal alkene structure, alkyl groups containing an aromatic functional group, alkyl groups containing an amide bond, and the like.

The number of the ethylenically unsaturated bonds in the functional group containing an ethylenically unsaturated bond is usually from 1 to 5 and preferably from 1 to 3. At this time, since the ethylenically unsaturated bond constituting aromaticity of an aromatic compound does not have crosslinking ability, the bond is not included in the "ethylenically unsaturated bond".

Incidentally, the functional group containing an ethylenically unsaturated bond may have an unsaturated bond other than the ethylenically unsaturated bond, such as a carbonyl group, an amide bond, or the like.

Such R2 is a functional group containing an ethylenically unsaturated bond in which molecular weight per ethylenically unsaturated bond (hereinafter sometimes referred to as unsaturated group equivalent) is usually 200 or less, and is particularly preferably a functional group containing an ethylenically unsaturated bond in which the ethylenically unsaturated group equivalent is 150 or less.

Moreover, the number of carbon atoms of such R2 is usually from 3 to 20, preferably from 3 to 15, and particularly preferably from 3 to 10.

Specific examples of such R2 include alkyl groups containing a terminal vinyl structure such as $CH_2$=CH— (unsaturated group equivalent: 27) and $CH_2$=$C(CH_3)$— (unsaturated group equivalent: 41), alkyl groups containing an internal alkene structures such as $CH_3$—CH=CH— (unsaturated group equivalent: 41), $CH_3CH_2$CH=CH— (unsaturated group equivalent: 55), $CH_3$—CH=CH—CH=CH— (unsaturated group equivalent: 33.5), and $(CH_3)_2$C=CH—$CH_2CH_2$CH$(CH_3)CH_2$— (unsaturated group equivalent: 125), alkyl groups containing an aromatic functional group such as $C_6H_5$CH=CH— (unsaturated groups equivalent: 103), alkyl groups containing an amide bond such as $CH_2$=CHCONHCH$_2$— (unsaturated group equivalent: 84) and $CH_2$=$C(CH_3)$CONHCH$_2$— (unsaturated group equivalent: 98), and the like.

Since R2 is a functional group derived from the aldehyde compound, it is possible to adjust R2 by selecting the aldehyde compound to be used. As such an aldehyde compound, there may be mentioned aliphatic aldehydes, alicyclic aldehydes, aromatic aldehydes, and the like, and it is preferable to use an aldehyde compound having 2 to 20 carbon atoms. Specific examples of preferred aldehyde compounds include acrolein (R2 is $CH_2$=CH—), crotonaldehyde (R2 is $CH_3$—CH=CH—), methacrolein (R2 is $CH_2$=$C(CH_3)$—) trans-2-pentenal (R2 is $CH_3CH_2$CH=CH—), trans,trans-2,4-hexadienal (R2 is $CH_3$—CH=CH—CH=CH—), citronellal (R2 is $(CH_3)_2$C=CH—$CH_2CH_2$CH$(CH_3)CH_2$—), cinnamaldehyde (R2 is $C_6H_5$CH=CH—), acrylamidoacetaldehyde (R2 is $CH_2$=CHCONHCH$_2$—) methacrylamidoacetaldehyde (R2 is $CH_2$=$C(CH_3)$CONHCH$_2$—), all-trans-retinal (R2 is $C_{19}H_{27}$—), and the like.

The content of the structural unit represented by the chemical formula (3) (hereinafter sometimes referred to as structural unit (3)) in the polyvinyl acetal-based resin (A) is based on the number of hydroxyl groups in the polyvinyl alcohol that is a precursor of the polyvinyl acetal-based resin and means, among them, a ratio of the number of hydroxyl groups acetalized with an aldehyde compound having a functional group containing an ethylenically unsaturated bond (such a ratio is referred to as "degree of crosslinking group modification"). That is, as a calculation method of the degree of crosslinking group modification, a method of counting the number of hydroxyl groups subjected to acetalization with the aldehyde compound having the functional group containing an ethylenically unsaturated bond is adopted and mol percent of the degree of crosslinking group modification is calculated.

The degree of crosslinking group modification of the structural unit (3) in the polyvinyl acetal-based resin (A) is usually from 0.1 to 15% by mol. The degree of crosslinking group modification of the structural unit (3) is more preferably from 0.5 to 10% by mol, particularly preferably from 1 to 10% by mol, and especially preferably from 1 to 4% by mol. In the case where the degree of crosslinking group modification is too high, there is a possibility that the adhesiveness to the collector becomes low since the degree of curing contraction owing to crosslinking increases and, in the case where the degree of crosslinking group modification is too low, the effect of crosslinking is a little and there is a tendency that the effects of the invention are not sufficiently obtained.

In the binder (and binder composition) of the invention, it is possible to control the degree of electrolytic solution swelling by controlling the content of each of the structural units (2) and (3) in the polyvinyl acetal-based resin (A).

For example, in the case where the degree of electrolytic solution swelling of the binder is appropriately large in the electrode to be obtained (for example, the degree of electrolytic solution swelling is from 5 to 30%), it becomes easy for the electrolytic solution to pass through the binder and the case is considered to contribute the improvement of charging and discharging rate of the resulting battery. In the case of requiring such a function, it is preferable to increase the degree of acetalization of the structural unit (2) and to increase the degree of crosslinking group modification of the structural unit (3). Specifically, by using a polyvinyl acetal-based resin (A) in which the degree of acetalization of the structural unit (2) is usually more than 30 to 40% by mol and preferably from 32 to 40% by mol and the degree of crosslinking group modification of the structural unit (3) is usually 3% by mol or more and preferably 3 to 10% by mol, it is made possible to maintain the degree of elution and the degree of swelling of the binder (and binder composition) to large degree ranges while appropriately suppressing them and thus a binder suitable for the above purpose can be obtained. Moreover, in the case where the degree of acetalization of the structural unit (2) is usually more than 30 to 40% by mol, the case is also preferable in view of improvement in productivity of the polyvinyl acetal-based resin (A).

Furthermore, in the case where the degree of electrolytic solution swelling of the binder is small in the resulting electrode (for example, the degree of electrolytic solution swelling is less than 5%), the case is considered to contribute an increase in capacity of the resulting battery. In the case of requesting such a function, it is preferable to lower the degree of acetalization of the structural unit (2) and to control the degree of crosslinking group modification of the structural unit (3) to appropriately low degree ranges. Specifically, it is preferable to use a polyvinyl acetal-based resin (A) in which the degree of acetalization of the structural unit (2) is usually from 10 to 30% by mol and the degree of crosslinking group modification of the structural unit (3) is usually 5% by mol or less and preferably from 1 to 4% by mol.

Through crosslinking of the polyvinyl acetal-based resin (A) as a binder, the binder (and binder composition) for a lithium ion secondary battery electrode of the invention is low in both the degree of elution and the degree of swelling with respect to an electrolytic solution, can expand or contract following the application or removal of stress derived from an electrode active material, and can continue to follow the electrode active material even when the expansion and contraction are repeated.

In the invention, by using a polyvinyl acetal-based resin (A) containing a crosslinking group introduced thereinto as a binder, it becomes possible to provide a binder (and binder composition) which is low in both the degree of elution and the degree of swelling.

In general, it is known that, even if an uncrosslinked polymer dissolves in a solvent, a crosslinked polymer does not dissolve but swells in the solvent. That is, this is because, when solvent molecules infiltrate into the reticulated structure of a polymer, the reticulated structure of the uncrosslinked polymer is loosen and the polymer dissolves but, in the case of the crosslinked polymer, it cannot dissolve since a force of contracting the polymer chain between the reticulations owing to rubbery elasticity acts as a suppressing force ("Koubunshi Bussei" written by Junji Furukawa, Kagaku-Dojin Publishing Company, INC, p. 17). Therefore, the degree of elution and the degree of swelling of the binder with respect to an electrolytic solution does not correlate to each other.

There is a case where the polyvinyl acetal-based resin (A) contains a structural unit derived from a vinyl ester monomer (hereinafter sometimes referred to as vinyl ester structural unit). Such a vinyl ester structural unit is usually derived from a vinyl alcohol-based resin that is a precursor of the polyvinyl acetal-based resin.

The content of the vinyl ester structural unit in the polyvinyl acetal-based resin (A) is usually from 0 to 20% by mol. It is preferably from 0 to 10% by mol and particularly preferably from 0 to 5% by mol. In the case where the vinyl ester structural unit of the polyvinyl acetal-based resin (A) is too large, the resin is prone to elute into an electrolytic solution and the objective effects tend to be difficult to obtain.

The average degree of polymerization of the polyvinyl acetal-based resin (A) is the same as that of the polyvinyl alcohol-based resin that is a precursor. The average degree of polymerization (measured in accordance with JISK 6726) of such a polyvinyl acetal-based resin (A) is usually 1,500 or more. The average degree of polymerization is more preferably from 2,000 to 3,000 and particularly preferably from 2,500 to 3,000. In the case where the average degree of polymerization is too high, the viscosity of the binder (and binder composition) becomes too high and the production workability of the electrode tends to decrease and, in the case where it is too low, the effects of the invention tend to be difficult to obtain efficiently.

The polyvinyl alcohol-based resin that is a precursor of the polyvinyl acetal-based resin (A) can be obtained by saponifying a polyvinyl ester. Examples of the vinyl ester include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl versatate, and the like. Among them, vinyl acetate is suitable from the standpoint of economical efficiency.

The polyvinyl alcohol-based resin may be one obtained by copolymerization with an ethylenically unsaturated monomer within the range where the effects of the invention are not impaired. The ethylenically unsaturated monomer is not particularly restricted and examples thereof include α-olefins such as propylene, isopropylene, butylene, isobutylene, pentylene, hexylene, cyclohexylene, cyclohexylethylene, and cyclohexylpropylene; hydroxyl group-containing α-olefins such as 3-butene-1-ol, 4-penten-1-ol, and 3-butene-1,2-diol; further, vinylene carbonates and unsaturated acids such as acrylic acid, methacrylic acid, phthalic acid (anhydride), maleic acid (anhydride), and itaconic acid (anhydride) or salts thereof, or mono- or dialkyl esters, nitriles such as acrylonitrile, amides such as acrylamide and methacrylamide, olefin sulfonic acids such as ethylenesulfonic acid, allylsulfonic acid, and methallylsulphonic acid or salts thereof, 3,4-dihydroxy-1-butene, 3,4-diacyloxy-1-butenes such as 3,4-diacetoxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diacyloxy-1-pentene, 4,5-dihydroxy-3-methyl-1-pentene, 4,5-diacyloxy-3-methyl-1-pentene, 5,6-dihydroxy-1-hexene, 5,6-diacyloxy-1-hexene, 2-glycerine monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, glycerin monoisopropenyl ether, and the like. Also included are vinylethylene carbonate or vinyltrimethoxysilane, vinylmethyldimethoxysilane, vinyldimethylmethoxysilane, vinyltriethoxysilane, vinylmethyldiethoxysilane, vinyldimethylethoxysilane, allyltrimethoxysilane, allylmethyldimethoxysilane, allyldimethylmethoxysilane, allyltriethoxysilane, allymethyldiethoxysilane, allyldimethylethoxysilane, vinyltris(β-methoxyethoxy)silane, vinylisobutyldimethoxysilane, vinylethyldimethoxysilane, vinylmethoxydibutoxysilane, vinyldimethoxybutoxysilane, vinyltributoxysilane, vinylmethoxydihexyloxysilane, vinyldimethoxyhexyloxysilane, vinyltrihexyloxysilane, vinylmethoxydioctyloxysilane, vinyldimethoxyoctyloxysilane, vinyltrioctyloxysilane, vinylmethoxydilauryloxysilane, vinyldimethoxylauryloxysilane, vinylmethoxydioleyloxysilane, vinyldimethoxyoleyloxysilane, and the like. Moreover, there can also be used an end-modified polyvinyl alcohol obtained by copolymerizing a vinyl ester-based monomer such as vinyl acetate and ethylene in the presence of a thiol compound such as thiolacetic acid or mercaptopropionic acid, and saponifying the resulting one.

The polymerization of the vinyl ester-based monomer can be carried out by any known polymerization method such as solution polymerization, suspension polymerization, or emulsion polymerization. Also for saponification of the resulting polymer, it is possible to adopt a known saponification method which is conventionally performed. That is, the saponification can be carried out in a state that the copolymer is dissolved in an alcohol or water/an alcohol solvent, using an alkali catalyst or an acid catalyst. As the alkali catalyst, it is possible to use a hydroxide or an alcoholate of an alkali metal, such as potassium hydroxide, sodium hydroxide, sodium methylate, sodium ethylate, potassium methylate, or lithium methylate.

The polyvinyl acetal-based resin is produced by acetalization of the resulting polyvinyl alcohol-based resin with an aldehyde compound. The acetalization reaction may be carried out under known general conditions. Typically, the aldehyde compound is blended into a polyvinyl alcohol-based resin aqueous solution in the presence of an acid catalyst and the acetalization reaction is allowed to proceed. With the progress of the acetalization reaction, polyvinyl acetal-based resin particles precipitate and hereinafter, a method of allowing the reaction to proceed in a heterogeneous system is generally performed.

The acetalization reaction is preferably initiated in a low-temperature state. For example, there may be mentioned I) a method of cooling the polyvinyl alcohol resin aqueous solution and blending an acid and a predetermined amount of the aldehyde compound to initiate the reaction, II) a method of blending the aldehyde compound into the polyvinyl alcohol resin aqueous solution and, after being cooled, blending an acid to initiate the reaction, and III) a method of blending an acid into the polyvinyl alcohol resin aqueous solution and, after being cooled, blending the aldehyde compound to initiate the reaction.

Incidentally, upon preparation of an aqueous solution containing a polyvinyl alcohol-based resin, usually, it is preferable to heat the liquid to achieve dissolution but, in the above I)~III), unless otherwise specified, the solution means an aqueous solution cooled to ordinary temperature after heating and dissolution.

As such the aldehyde compound, a compound affording structures represented by the structural units (2) and (3) is used. That is, as the structural unit (2), formaldehyde (R1 is hydrogen), acetaldehyde (R1 is an alkyl group having 1 carbon atom), butyraldehyde (R1 is an alkyl group having 3 carbon atoms), pentyl aldehyde (R1 is an alkyl group having 4 carbon atoms), or decane aldehyde (R1 is an alkyl group having 9 carbon atoms) are included and, as the structural unit (3), the aldehyde compounds described above are used.

The aldehyde compound affording the structural units (2) and (3) is normally blended at the time of blending the aldehyde compound in the above acetalization reaction in a batch together. If necessary, it is also possible to blend one before cooling and to blend another after cooling. Preferred is an acetalization method in which the polyvinyl alcohol-based resin is dissolved in water to prepare an aqueous solution, the solution is cooled to 5 to 50° C., the aldehyde compound affording the structural units (2) and (3) is blended, and then the reaction is initiated by blending an acid.

As the acid to be used in the acetalization reaction, usually, there may be mentioned inorganic acids such as hydrochloric acid, sulfuric acid, and nitric acid and organic acids such as p-toluenesulfonic acid, and they may be used alone or as a mixture of two or more thereof. Furthermore, as an alkali compound to be used for neutralizing a powdery reaction product obtained after the acetalization reaction, there may be mentioned alkali metal hydroxides such as sodium hydroxide and potassium hydroxide and also amine-based compounds such as ammonia, triethylamine, and pyridine.

The acetalization reaction is preferably carried out under stirring. In order to perform the acetalization reaction completely, it is preferable to continue the reaction usually at 50 to 80° C. The acetalization reaction is usually carried out for 1 to 10 hours.

The powdery reaction product obtained after the acetalization reaction is filtered, neutralized with an aqueous alkali solution, then washed with water, and dried, thereby obtaining an objective polyvinyl acetal-based resin (A).

[Binder for Lithium Ion Secondary Battery Electrode]

The binder (and binder composition) for a lithium ion secondary battery electrode is an adhesive that bonds electrode active materials each other and an electrode active material and a collector. In the electrode obtained by using such the binder, the resin component derived from the binder is exposed for a long period of time to an environment in contact with a carbonate ester-based electrolytic solution.

The binder (and binder composition) for a lithium ion secondary battery electrode of the invention is low in the degree of elution and the degree of swelling with respect to the ester-based electrolytic solution, maintains a high elastic modulus even in the state of being swollen with the electrolytic solution, and can expand or contract following the application or removal of stress derived from the electrode active material. Moreover, it has an advantage that it is possible to continue to follow the electrode active material even when the expansion and contraction are repeated.

The binder for a lithium ion secondary battery electrode of the invention is usually a binder composition containing a solvent (B). The solvent (B) dissolves the polyvinyl acetal-based resin (A) and can improve the workability at the time of electrode preparation through impartment of a desired viscosity to the binder. As the solvent (B), for example, it is possible to use amide-based solvents such as N-methylpyrrolidone (NMP), dimethylformamide, dimethylacetamide, and methylformamide, sulfoxides such as dimethyl sulfoxide, alcohol-based solvents such as 1,1,1,3,3,3-hexafluoro-2-propanol. In view of easiness to handle and relative inexpensiveness, preferred are amide-based solvents and particularly preferred is N-methylpyrrolidone.

The binder composition for a lithium ion secondary battery electrode of the invention may contain a resin having other binding performance and active material dispersibility, a polymerization initiator (C), a crosslinked agent, a silane coupling agent, and the like in the range where the effects of the invention are not impaired. Examples of the resin having other binding performance and active material dispersibility include polyvinylidene fluoride, vinylidene fluoride-hexafluoropropylene copolymer, polyvinylpyrrolidone, polyethylene oxide, polyvinyl acetate, cellulose acetate, carboxymethyl cellulose, and the like.

Moreover, in addition to the above additives, the composition may contain a small amount of impurities and the like which are contained in the production raw materials and the like of the constitutional components of the adhesive.

The polyvinyl acetal-based resin (A) to be used in the invention has a crosslinking group structural unit and the functional group is crosslinked by heat or light.

Especially, the case where the binder composition of the invention contains a polymerization initiator (C) is preferable from the viewpoint that the crosslinking reaction satisfactorily proceeds. As the polymerization initiator (C), for example, it is possible to use various polymerization initiators such as a photopolymerization initiator (c1) and a thermal polymerization initiator (c2) and, if necessary, both may be used in combination.

Examples of the photopolymerization initiator (c1) include acetophenones such as diethoxyacetophenone, 2-hydroxy-2-methyl-1-phenyl-propan-1-one, benzyl dimethyl ketal, 4-(2-hydroxyethoxy)phenyl-(2-hydroxy-2-propyl) ketone, 1-hydroxycyclohexyl phenyl ketone, 2-methyl-2-morpholino(4-thiomethylphenyl)propan-1-one, 2-benzyl-2-dimethylamino-1-(4-morpholinophenyl)butanone, and 2-hydroxy-2-methyl-1-[4-(1-methylvinyl)phenyl]propanone oligomers; benzoins such as benzoin, benzoin methyl ether, benzoin ethyl ether, benzoin isopropyl ether, and benzoin isobutyl ether; benzophenones such as benzophenone, methyl o-benzoylbenzoate, 4-phenylbenzophenone, 4-benzoyl-4'-methyl-diphenyl sulfide, 3,3',4,4'-tetra(t-butylperoxycarbonyl)benzophenone, 2,4,6-trimethylbenzophenone, 4-benzoyl-N,N-dimethyl-N-[2-(1-oxo-2-propenyloxy)ethyl]benzenemethanaminium bromide, and (4-benzoylbenzyl)trimethylammonium chloride; thioxanthones such as 2-isopropylthioxanthone, 4-isopropylthioxanthone, 2,4-diethylthioxanthone, 2,4-dichlorothioxanthone, 1-chloro-4-propoxythioxanthone, and 2-(3-dimethylamino-2-hydroxy)-3,4-dimethyl-9H-thioxanthon-9-one mesochloride; acylphosphine oxides such as 2,4,6-trimethylbenzoyl-diphenylphosphine oxide, bis(2,6-dimethoxybenzoyl)-2,4,4-trimethyl-pentylphosphine oxide, and bis(2,4,6-trimethylbenzoyl)-phenylphosphine oxide; and the like. Incidentally, these photopolymerization initiators (c1) may be used alone or two or more thereof may be used in combination.

Moreover, as an auxiliary agent thereof, it is also possible to use triethanolamine, triisopropanolamine, 4,4'-dimethylaminobenzophenone (Michler's ketone), 4,4'-diethylaminobenzophenone, 2-dimethylaminoethylbenzoic acid, ethyl 4-dimethylaminobenzoate, (n-butoxy)ethyl 4-dimethylaminobenzoate, isoamyl 4-dimethylaminobenzoate, 2-ethylhexyl 4-dimethylaminobenzoate, 2,4-diethylthioxanthone, 2,4-diisopropylthioxanthone, or the like in combination.

Of these, it is preferable to use benzyl dimethyl ketal, 1-hydroxycyclohexyl phenyl ketone, benzoyl isopropyl ether, 4-(2-hydroxyethoxy)-phenyl (2-hydroxy-2-propyl) ketone, or 2-hydroxy-2-methyl-1-phenylpropan-1-one.

Furthermore, examples of the thermal polymerization initiator (c2) include organic peroxide-based initiators such as methyl ethyl ketone peroxide, cyclohexanone peroxide, methylcyclohexanone peroxide, methyl acetoacetate peroxide, acetylacetate peroxide, 1,1-bis(t-hexylperoxy)-3,3,5-trimethylcyclohexane, 1,1-bis(t-hexylperoxy)-cyclohexane, 1,1-bis(t-butylperoxy)-3,3,5-trimethylcyclohexane, 1,1-bis(t-butylperoxy)-2-methylcyclohexane, 1,1-bis(t-butylperoxy)-cyclohexane, 1,1-bis(t-butylperoxy)cyclododecane, 1,1-bis(t-butylperoxy)butane, 2,2-bis(4,4-di-t-butylperoxycyclohexyl)propane, p-menthane hydroperoxide, diisopropylbenzene hydroperoxide, 1,1,3,3-tetramethylbutyl hydroperoxide, cumene hydroperoxide, t-hexyl hydroperoxide, t-butyl hydroperoxide, α,α'-bis(t-butylperoxy)diisopropylbenzene, dicumyl peroxide, 2,5-dimethyl-2,5-bis(t-butylperoxy)hexane, t-butylcumyl peroxide, di-t-butyl peroxide, 2,5-dimethyl-2,5-bis(t-butylperoxy)hexyne-3, isobutyryl peroxide, 3,5,5-trimethylhexanoyl peroxide, octanoyl peroxide, lauroyl peroxide, stearoyl peroxide, succinic acid peroxide, m-toluoylbenzoyl peroxide, benzoyl peroxide, di-n-propyl peroxydicarbonate, diisopropyl peroxydicarbonate, bis(4-t-butylcyclohexyl) peroxydicarbonate, di-2-ethoxyethyl peroxydicarbonate, di-2-ethoxyhexyl peroxydicarbonate, di-3-methoxybutyl peroxydicarbonate, di-s-butyl peroxydicarbonate, di(3-methyl-3-methoxybutyl) peroxydicarbonate, α,α'-bis(neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 1,1,3,3-tetramethylbutyl peroxy-2-ethylhexanoate, 2,5-dimethyl-2,5-bis(2-ethylhexanoylperoxy) hexanoate, 1-cyclohexyl-1-methylethyl peroxy-2-ethylhexanoate, t-hexyl peroxy-2-ethylhexanoate, t-butyl peroxy-2-ethylhexanoate, t-hexyl peroxyisopropyl monocarbonate, t-butyl peroxyisobutyrate, t-butyl peroxymaleate, t-butyl peroxy-3,5,5-trimethylhexanoate, t-butyl peroxylaurate, t-butylperoxyisopropyl monocarbonate, t-butylperoxy-2-ethylhexyl monocarbonate, t-butyl peroxyacetate, t-butyl peroxy-m-toluylbenzoate, t-butyl peroxybenzoate, bis(t-butylperoxy) isophthalate, 2,5-dimethyl-2,5-bis(m-toluylperoxy)hexane, t-hexyl peroxybenzoate, 2,5-dimethyl-2,5-bis (benzoylperoxy)hexane, t-butyl peroxyallyl monocarbonate, t-butyltrimethylsilyl peroxide, and 3,3',4,4'-tetra(t-butylperoxycarbonyl)benzophenone; azo initiators such as 2-phenylazo-4-methoxy-2,4-dimethylvaleronitrile, 1-[(1-cyano-1-methylethyl) azo]formamide, 1,1'-azobis(cyclohexane-1-carbonitrile), 2,2'-azobis(2-methylbutyronitrile), 2,2'-azobisisobutyronitrile, 2,2'-azobis(2,4-dimethylvaleronitrile), 2,2'-azobis(2-methylpropionamidine) dihydrochloride, 2,2'-azobis(2-methyl-N-phenylpropionamidine) dihydrochloride, 2,2'-azobis[N-(4-chlorophenyl)-2-methylpropionamidine] dihydrochloride, 2,2'-azobis [N-(4-hydrophenyl)-2-methylpropionamidine] dihydrochloride, 2,2'-azobis[2-methyl-N-(phenylmethyl)propionamidine] dihydrochloride, 2,2'-azobis[2-methyl-N-(2-propenyl)propionamidine] dihydrochloride, 2,2'-azobis[N-(2-hydroxyethyl)-2-methylpropionamidine] dihydrochloride, 2,2'-azobis[2-(5-methyl-2-imidazolin-2-yl)propane] dihydrochloride, 2,2'-azobis[2-(2-imidazolin-2-yl)propane] dihydrochloride, 2,2'-azobis[2-(4,5,6,7-tetrahydro-1H-1,3-diazepin-2-yl)propane] dihydrochloride, 2,2'-azobis[2-(3,4,5,6-tetrahydropyrimidin-2-yl)propane] dihydrochloride, 2,2'-azobis[2-(5-hydroxy-3,4,5,6-tetrahydropyrimidin-2-yl)propane] dihydrochloride, 2,2'-azobis[2-[1-(2-hydroxyethyl)-2-imidazolin-2-yl]propane] dihydrochloride, 2,2'-azobis[2-(2-imidazolin-2-yl)propane], 2,2'-azobis[2-methyl-N-[1,1-bis(hydroxymethyl)-2-hydroxyethyl]propionamide], 2,2'-azobis[2-methyl-N-[1,1-bis(hydroxymethyl)ethyl]propionamide], 2,2'-azobis[2-methyl-N-(2-hydroxyethyl)propionamide], 2,2'-azobis(2-methylpropionamide), 2,2'-azobis(2,4,4-trimethylpentane), 2,2'-azobis(2-methylpropane), dimethyl-2,2-azobis(2-methylpropionate), 4,4'-azobis(4-cyanopentanoic acid), and 2,2'-azobis[2-(hydroxymethyl)propionitrile]; and the like. Incidentally, these thermal polymerization initiators may be used alone or two or more thereof may be used in combination.

The content of the polymerization initiator (C) is usually from 0.5 to 20 parts by weight based on 100 parts by weight of the polyvinyl acetal-based resin (A), preferably from 0.8 to 15 parts by weight, and more preferably from 1 to 10 parts by weight. When the content of the polymerization initiator (C) is too small, there is a tendency that the efficiency of the crosslinking reaction is difficult to increase and, when the content is too large, unreacted substances tend to adversely affect the resin after crosslinking.

The binder composition for a lithium ion secondary battery electrode active material of the invention is obtained by mixing a blending agent to be used, if necessary, together with the above components.

For stirring operation, it is possible to utilize a stirring machine, a defoaming machine, a bead mill, a high-pressure homogenizer, or the like.

The binder composition for a lithium ion secondary battery electrode active material of the invention is typically a homogeneous solution or a heterogeneous suspension. The homogeneous solution is preferable because handling ability is good at the preparation of the electrode.

The content of the polyvinyl acetal-based resin (A) in the resin solid mass in the binder composition for a lithium ion secondary battery electrode active material of the invention is usually from 50 to 100% by weight, preferably from 70 to 100% by weight, and more preferably from 80 to 100% by weight. When such a value is too low, the effects of the invention tend to be difficult to obtain efficiently. The resin solid concentration in the binder composition of the invention is usually from 0.5 to 18% by weight, preferably from 1 to 15% by weight, and more preferably from 1 to 12% by weight. When the value is too low, it is necessary to remove a large amount of solvent (B) at the time of preparing the electrode and there is a tendency of decreasing economic efficiency and, when the value is too high, there is a tendency that work efficiency decreases at the time of preparing the electrode and/or accuracy of controlling electrode density decreases.

[Preparation of Slurry for Electrode: Production of Electrode]

A slurry for a lithium ion secondary battery electrode can be prepared by mixing an electrode active material into the binder (and the binder composition) according to the invention.

As the positive electrode active material, for example, it is possible to use olivine-type lithium iron phosphate, lithium cobaltate, lithium manganate, lithium nickelate, a ternary nickel-cobalt-lithium manganate, a lithium-nickel-cobalt-aluminum composite oxide, or the like.

As the negative electrode active material, a carbon material is preferred. Examples of the carbon material include graphite-based carbon materials (graphite) such as natural graphite, artificial graphite, and expanded graphite, carbon black, activated carbon, carbon fiber, coke, soft carbon, hard carbon, and the like. In particular, in the case where a lithium-containing metal composite oxide, a carbon powder, a silicon powder, a tin powder, or a mixture thereof is used, the case is preferred since the effects of the present invention can be effectively exhibited.

The content of the active material in the slurry for an electrode is preferably from 10 to 95% by weight, more preferably from 20 to 80% by weight, and particularly preferably from 35 to 65% by weight.

The average particle size of the active material is usually from 1 to 100 μm, more preferably from 1 to 50 μm, and further more preferably from 1 to 25 μm. As the average particle size of the active material, it is intended to adopt a value measured by a laser diffraction particle size distribution measurement (laser diffraction scattering method).

As for the content ratio of the active material in the slurry for an electrode to the binder for an electrode of the invention, the polyvinyl acetal-based resin (A) contained in the binder for an electrode of the invention is usually from 0.1 to 10 parts by weight, preferably from 0.1 to 5 parts by weight, and particularly preferably from 0.1 to 4 parts by weight based on 100 parts by weight of the active material. When the content of the polyvinyl acetal-based resin (A) is too high, inactive portions increase in the active material layer and there is a tendency that the internal resistance increases and the weight energy density and the like decreases. On the other hand, when the content of the polyvinyl acetal-based resin (A) is too small, the desired binding force is not obtained, the active material is prone to fall off or is prone to peel off from the collector, and there is a tendency that the battery performance decreases.

Incidentally, the content ratio is the same ratio also in the resulting lithium ion secondary battery electrode.

In the slurry for an electrode, in addition to the active material and the binder for an electrode, a known blending agent may be contained, such as those usually contained in other slurry for an electrode. For example, a conductive auxiliary agent, a flame retardant aid, a thickener, a defoaming agent, a leveling agent, and an adhesion-imparting agent may be added. The blending ratios of these components are in known general ranges and the blending ratio can be also adjusted by appropriately referring to the known knowledge about lithium ion secondary batteries.

The conductive auxiliary agent means a formulation to be blended for improving the conductivity. As the conductive auxiliary agent, graphite, carbon powder such as acetylene black, various carbon fibers such as a vapor grown carbon fiber (VGCF), and the like may be mentioned.

Furthermore, in consideration of workability at the time of electrode preparation, it is possible to add a solvent for the purpose of viscosity adjustment or the like. As the solvent, the same as the above-described solvent (B) can be used.

For mixing the binder for an electrode, the active material, and a blending agent to be used as necessary, and the solvent, a stirring machine, a defoaming machine, a bead mill, a high-pressure homogenizer, or the like can be utilized. Moreover, the preparation of the slurry for an electrode is preferably carried out under reduced pressure. Thereby, it is possible to prevent generation of air bubbles in the resulting active material layer.

The slurry for an electrode prepared as above is, for example, applied on a collector to form an electrode (layer). An electrode can be obtained by drying it and crosslinking the polyvinyl acetal-based resin (A) by heat or light.

As the collector to be used for the electrode, one used as the collector of lithium ion secondary cell electrodes can be used. Specifically, as the collector for the negative electrode, a metal foil such as copper or nickel, an etched metal foil, an expanded metal, or the like is used. As the collector for the positive electrode, a metal material such as aluminum, copper, nickel, tantalum, stainless steel, or titanium may be mentioned and the collector can be suitably selected and used according to the type of the objective electricity storage device.

As the method of applying the slurry for an electrode to the collector, there may be mentioned an extrusion coater method, a doctor blade method, a reverse roll method, a comma bar method, a gravure method, an air knife method, an applicator method, and the like.

If necessary, it is preferable that pressing is performed after forming the electrode on the collector and thereby the resin density is increased before the crosslinking reaction.

As the drying conditions after the electrode formation, the processing temperature is usually from 20 to 250° C., and more preferably from 50 to 150° C. The processing time is usually from 1 to 120 minutes, and more preferably from 5 to 60 minutes.

The thickness of the resulting electrode layer is usually from 20 to 500 μm, more preferably from 20 to 300 μm, and more preferably from 20 to 150 μm.

By exposing the electrode (layer) to heat or light to crosslink the polyvinyl acetal-based resin (A) as a binder, there is obtained an electrode in which the active materials each other and the active material and the collector are satisfactorily adhered.

In the case of performing the crosslinking reaction by light, usually, it is possible to use a method such as ultraviolet irradiation or electron beam irradiation. It is preferable to adopt a method of ultraviolet irradiation from the viewpoints of economical efficiency and productivity. For the ultraviolet irradiation, a xenon lamp, a high-pressure mercury lamp, an ultrahigh-pressure mercury lamp, or a metal halide lamp or the like can be used. When a high-pressure mercury lamp is used, it is preferable to cure the resin at a conveying rate of 5 to 60 m/minute per one lamp having an energy of 80 to 240 W/cm. After the crosslinking reaction by light, when further crosslinking reaction is performed by heat, the initiator can be efficiently used and thus the case is preferable.

In the case of performing the crosslinking reaction by heat, usually, processing is performed at a processing temperature of 20 to 250° C. for from 1 to 120 minutes. More preferably, a method of performing the reaction at 50 to 150° C. for 5 or 60 minutes is preferred.

The case of performing the crosslinking reaction by heat is preferred because curing can be simultaneously achieved at the time of drying treatment after the electrode formation.

As for the binder for a lithium ion secondary battery electrode of the invention, the polyvinyl acetal-based resin (A) as the binder is bonded to the active material and the collector in the form of an uncrosslinked state (i.e. the objective electrode is formed) and dried and heat or light is applied to crosslink the polyvinyl acetal-based resin (A), thereby obtaining an electrode in which the active material and the collector are satisfactorily adhered.

In the case of carrying out the crosslinking reaction prior to bonding of the active material and the collector, there is a tendency that the active material and the collector cannot be satisfactorily bonded.

As described above, the lithium ion secondary battery electrode of the invention contains a crosslinked product of the polyvinyl acetal-based resin (A). The resin component obtained by crosslinking the polyvinyl acetal-based resin (A) has a low degree of elution and a low degree of swelling with respect to a carbonate ester-based electrolytic solution, such as ethylene carbonate, propylene carbonate, dimethyl carbonate, or diethyl carbonate, maintains a high elastic modulus even in a state swollen with the electrolytic solution, and can be expanded or contracted following the application or removal of a stress derived from the active material. Moreover, it has an advantage of being able to continue to follow the electrode active material. Therefore, in a lithium ion secondary battery having the electrode obtained using the binder for a lithium ion secondary battery electrode of the invention, battery characteristics are satisfactory.

The electrode obtained using the binder (and binder composition) for a lithium-ion secondary battery electrode of the invention has the following characteristics.

The crosslinking density of the binder binding resin component in the electrode prepared using the binder for a lithium ion secondary battery electrode of the invention is usually from $0.5 \times 10^{-4}$ to $10 \times 10^{+4}$ mol/cm$^3$, further preferably from $1 \times 10^{-4}$ to $5 \times 10^{-4}$ mol/cm$^3$, particularly preferably from $2 \times 10^{-+4}$ to $5 \times 10^{-4}$ mol/cm$^3$, and most preferably from $2.5 \times 10^{-4}$ to $4 \times 10^{-4}$ mol/cm$^3$.

The crosslinking density is measured as follows.

For a film (25×5×0.02 to 0.05 mm) of the polyvinyl acetal-based resin (A) after crosslinking, the relationship between loss modulus and temperature is measured at a measurement frequency of 10 Hz using a dynamic viscoelasticity measuring apparatus DVA-225 (manufactured by IT Keisoku Seigyo K.K.) in accordance with JIS K-7244-4.

In the area where the loss modulus is rapidly reduced after it showed a maximum at room temperature or higher, temperature showing the maximum is regarded as glass transition point Tg. Similarly, the relation is also measured for a binder resin film having no cross-linking group, and the temperature is regarded as $Tg_0$.

Based on the glass transition point, the crosslinking density of the polyvinyl acetal resin film is calculated from the following Nielsen's empirical formula.

$$Tg - Tg_0 = 3.9 \times 10^{-4} \times v \qquad \text{(Nielsen's empirical formula)}$$

(Tg: glass transition temperature of the binder resin film subjected to crosslinking reaction, $Tg_0$: glass transition temperature of the binder resin film having no cross-linking group, v: it shows crosslinking density (mol/cm$^3$).)

Tg determined by the measurement method of the binder in the electrode prepared using the binder (and binder composition) for a lithium ion secondary battery electrode of the invention is usually from 70 to 100° C., more preferably from 78 to 100° C., especially preferably from 80 to 100° C., and most preferably from 85 to 100° C.

The degree of electrolytic solution swelling of the binder in the electrode prepared using the binder (and binder composition) for a lithium ion secondary battery electrode of the invention is usually form 0 to 20%, more preferably from 0 to 10%, and particular preferably from 0 to 5%.

As for the degree of swelling degree, using a film of 100 mm×15 mm×20 to 50 μm of the polyvinyl acetal-based resin (A) after crosslinking reaction, it is dried at 120° C. for 4 hours under reduced pressure and weight ($W_0$ (g)) thereof is measured. This film is immersed in about 10 g of a predetermined electrolytic solution at 23° C. and kept until constant weight. Then, it is taken out, the film surface is wiped lightly with filter paper and weight ($W_1$ (g)) is measured. From the data, the degree of electrolytic solution swelling is calculated in accordance with the following formula.

Degree of electrolytic solution swelling (%)=$((W_1-W_0)/W_0) \times 100$

The tensile permanent strain of the binder in the electrode prepared using the binder (and binder composition) for a lithium ion secondary battery electrode of the invention is usually form 0 to 20%, more preferably from 0 to 10%, particularly preferably from 0 to 5%, and most preferably from 0 to 2.5%. Also, the elastic modulus is usually from 0.5 to 5 GPa, more preferably from 1 to 4 GPa, and particularly preferably from 2 to 3 GPa.

The tensile permanent strain and elastic modulus are measured as follows. First, the polyvinyl acetal-based resin (A) after crosslinking is cut into a film of 100 mm×15 mm×20 to 50 μm, the film is immersed at 23° C. in about 10 g of diethyl carbonate and kept until constant weight. Then, it is taken out, the film surface was wiped lightly with filter paper, and stress is applied to create a state that the film is stretched by moving a gripping tool at 23° C. and 50 RH % at a test speed of 10 mm/min. within a tensile strain (distortion) of 3% in accordance with JIS K-7161.

Thereafter, the gripping tool is immediately returned to the original position to make a state of stress removal and the film is freely contracted. After 20 seconds, the gripping tool is moved to maximum length where the tensile load of the film is kept at 0 and a value obtained by dividing the amount of movement of the gripping tool by the original distance between the gripping tools is taken as tensile strain (%).

Then, an operation of stretching again the film at a test speed of 10 mm/min. to a tensile strain (distortion) of 3% with regard to the original distance between the gripping tools and thereafter immediately returning the gripping tool to the original position is repeated 30 times, and a tensile strain at 30th time is taken as tensile permanent strain (%).

In the middle of the operation, from the initial state at the time of first stretching to a tensile strain (distortion) of 3%, a tensile modulus is determined in accordance with JIS K-7161 10.3.

The tensile permanent strain increases with the repetition of the operation and, in the case where strain is generated owing to incomplete contraction with free contraction, the numerical value increases. A smaller numerical value of the tensile permanent strain means that the degree of contraction after the applied stress is removed is high and means that the film easily follows the expansion and contraction of the electrode active material.

Moreover, when the tensile strain is accumulated and exceeds the breaking strain of the original film, the film is sometimes broken in the middle of the repetition of the operation and thus it can no longer follow the expansion and contraction of the electrode.

As for the binder (and binder composition) for a lithium ion secondary battery electrode of the invention, by using a polyvinyl acetal-based resin (A) having a crosslinking group as a binder, the binder in the resulting electrode becomes a crosslinked resin of the polyvinyl acetal-based resin (A).

The crosslinked binder has an advantage that the degree of dissolution and the degree of swelling are low with respect to the carbonate ester-based electrolytic solution. Moreover, the binder can expand or contract following the application or removal of a stress derived from the electrode active material, and it can continue to follow the electrode active material even when the expansion and contraction are repeated.

Furthermore, since the elastic modulus is high even in the state of being swollen with the electrolytic solution, when the active material particles are expanded or contracted by charging and discharging, the deformation of the entire electrode layer can be reduced and the contact of the active materials each other and the contact of the active material with the collector can be maintained satisfactory, so that there is an effect that the initial charging and discharging efficiency and the charging and discharging cycle characteristics can be improved.

Therefore, a lithium ion secondary battery electrode using this binder tends to be able to achieve better charging and discharging characteristics.

[Lithium Ion Secondary Battery]

The lithium ion secondary battery comprising the electrode manufactured as described above will be described.

As the electrolytic solution, an aprotic polar solvent that dissolves a lithium salt is used. Examples thereof include carbonate ester-based solvents, for example, linear carbonate ester-based solvents such as diethyl carbonate, dimethyl carbonate, ethyl methyl carbonate, methyl propyl carbonate, isopropyl methyl carbonate, ethyl propyl carbonate, isopropyl ethyl carbonate, butyl methyl carbonate, butyl ethyl carbonate, and dipropyl carbonate, cyclic carbonate ester-based solvents such as ethylene carbonate, propylene carbonate, and butylene carbonate, and halogen-containing cyclic carbonate ester-based solvents such as chloroethylene carbonate and trifluoropropylene carbonate, ether-based solvents such as ethylene glycol dimethyl ether and propylene glycol dimethyl ether, heterocyclic compound-based solvents such as γ-butyrolactone, tetrahydrofuran, 2-methyltetrahydrofuran, sulfolane, 3-methylsulfolane, 2,4-dimethylsulfolane, and 1,3-dioxolane, carboxylate ester solvents such as methyl acetate, ethyl acetate, methyl formate, and ethyl formate, and the like. These solvents generally have from 2 to 15 carbon atoms, preferably from 3 to 10 carbon atoms, and particularly preferably from 3 to 8 carbon atoms. They are also used alone, but it is preferable to use as a mixture.

Especially when the electrolytic solution contains a carbonate ester-based solvent, there is a tendency that the effects of the invention can be effectively obtained. The electrolytic solution is often used with containing a cyclic carbonate-based solvent having 1 to 10 carbon atoms which has high dielectric constant and high boiling point, such as ethylene carbonate or propylene carbonate, and a linear carbonate-based solvent having 3 to 10 carbon atoms which is a low viscosity solvent, such as dimethyl carbonate, ethyl methyl carbonate, or diethyl carbonate.

As the lithium salt of the electrolyte, there may be used one conventionally used as an electrolyte of a non-aqueous electrolytic solution, for example, an inorganic salt such as $LiClO_4$, $LiPF_6$, $LiBF_4$, $LiAsF_6$, LiCl, or LiBr, an organic salt such as $LiCF_3SO_3$, $LiN(SO_2CF_3)_2$, $LiN(SO_2C_2F_5)_2$, $LiC(SO_2CF_3)_3$, $LiN(SO_3CF_3)_2$, or the like. Of these, it is preferable to use $LiPF_6$, $LiBF_4$, or $LiClO_4$.

The separator is not particularly limited, and a nonwoven fabric or a porous film of a polyolefin can be used.

The structure of the secondary battery is not particularly limited, and it may be applied to any conventionally known forms and structures, such as lamination type (flat type) battery and winding type (cylindrical type) battery. As for the electrical connection form (electrode structure) in the lithium ion secondary battery, it may be applied to any of (internal parallel connection type) battery and bipolar (internal series connection type) battery.

Based on the fact that the binder for an electrode of the invention is used, since the active materials each other and also the active material and the collector are satisfactorily bonded even when charging and discharging are repeated and the resin component derived from the binder is hardly swollen in the electrolytic solution, the lithium ion secondary battery obtained as above has good output characteristics.

EXAMPLES

The following will specifically describe the present invention with reference to Examples but the invention should not be construed as being limited to the description of the following Examples.

Incidentally, in the examples, "part" and "%" mean those on weight basis unless otherwise stated. Also, "v" means one on volume basis.

[Measurement and Evaluation Methods]

First, a description will be given of measurement and evaluation methods adopted in the following Examples.

(1) Measurement of Degree of Electrolytic Solution Swelling

A polyvinyl acetal-based resin (A) after crosslinking was converted into a film of 100×15×0.02 to 0.05 mm, which was dried at 120° C. for 4 hours under 0.005 MPa or less and weight thereof was measured ($W_0$ (g)). Then, the film was immersed at 23° C. in about 10 g of a predetermined electrolytic solution, and kept until constant weight was obtained. Thereafter, the film was taken out, the film surface was wiped lightly with filter paper, and weight was measured ($W_1$ (g)). From them, according to the following equation, the degree of electrolytic solution swelling was calculated.

Degree of electrolytic solution swelling (%)=(($W_1$−$W_0$)/$W_0$)×100

As the electrolyte solution, diethyl carbonate or propylene carbonate was used.

(2) Measurement of Degree of Elution of Electrolytic Solution

The film for which the measurement of the degree of electrolytic solution swelling had been finished was dried under conditions of 120° C., 0.005 MPa or less, and 4 hours and the weight was measured ($W_2$ (g)). From them, according to the following equation, the degree of elution of the electrolytic solution was calculated.

Degree of elution of electrolytic solution (%)=($W_0$−$W_2$)/$W_0$×100

(3) Calculation of Crosslinking Density and Glass Transition Point Tg

For a film (25×5×0.02 to 0.05 mm) of the polyvinyl acetal-based resin (A) after crosslinking, using a dynamic viscoelasticity measuring apparatus DVA-225 (manufactured by IT Keisoku Seigyo K.K.), the relation between loss modulus and temperature was measured at a measurement frequency of 10 Hz in accordance with JIS K-7244-4.

In the area where the loss modulus rapidly decreased after it showed a maximum at room temperature or higher, temperature showing a maximum was taken as a glass transition point Tg. Moreover, for a binder resin film having no crosslinking group, similar measurement was performed and the temperature was taken as $Tg_0$.

Based on such a glass transition point, the crosslinking density of the polyvinyl acetal-based resin film was calculated from the following Nielsen's empirical formula.

$Tg - Tg_0 = 3.9 \times 10^{-4} \times v$ (Nielsen's empirical formula)

(Tg: glass transition temperature of the binder resin film subjected to crosslinking reaction, $Tg_0$: glass transition temperature of the binder resin film having no cross-linking group, v: it shows crosslinking density (mol/cm$^3$).)

(4) Measurement of Tensile Permanent Strain of Swollen Film after Repeated Tensile Tests and (5) Measurement of Elastic Modulus of Swollen Film A polyvinyl acetal-based resin (A) after crosslinking was converted into a film of 100×15×0.02 to 0.05 mm, which was immersed at 23° C. in about 10 g of a predetermined electrolytic solution and kept until constant weight was obtained. Thereafter, the film was taken out, the film surface was wiped lightly with filter paper, and a gripping tool was moved to a tensile strain (distortion) of 3% at 23° C. and 50 RH % at a test speed of 10 mm/min. in accordance with JIS K-7161 using an autograph AG-IS (manufactured by Shimadzu Corporation).

Thereafter, the gripping tool was immediately returned to the original position to contract the film freely. After a waiting time of 20 seconds, the gripping tool was moved to maximum length where the tensile load of the film was kept at 0 and a value obtained by dividing the amount of movement of the gripping tool by the initial distance between the gripping tools was taken as tensile permanent strain (%).

Then, an operation of stretching again the film at a test speed of 10 mm/min. to a tensile strain (distortion) of 3% with regard to the initial distance between the gripping tools and thereafter immediately returning the gripping tool to the initial position was repeated 30 times, and tensile permanent strain at 30th time was measured. The tensile permanent strain increases with the repetition of the operation, which reflects the state that the strain that does not completely return to the original with free contraction is accumulated. Accordingly, a smaller numerical value of the tensile permanent strain means that the degree of contraction after the applied stress is removed is higher and means that the film easily follows the expansion and contraction of the electrode. Moreover, when the tensile permanent strain is accumulated and exceeds the breaking strain of the original film, the film is sometimes broken in the middle of the repetition of the operation and the case means that it can no longer follow the expansion and contraction of the electrode. In addition, in the middle of the operation, from the initial state at the time of first stretching to a tensile strain (distortion) of 3%, a tensile modulus was determined in accordance with JIS K-7161 10.3.

As for (4) Measurement of tensile permanent strain, diethyl carbonate was used as the electrolytic solution. As for (5) Measurement of elastic modulus, diethyl carbonate or propylene carbonate was used as the electrolytic solution.

(6) Measurement of Charging Capacity 8 parts of a polyvinyl acetal resin having a crosslinking group obtained in each example and 0.32 parts of 1,1-di(t-hexylperoxy)cyclohexane (Perhexa HC (manufactured by NOF Corporation)) as a polymerization initiator were dissolved in 92 parts of N-methylpyrrolidone (NMP) to prepare a solution, which was used as a polyvinyl acetal-based resin composition.

Separately, after 26 parts of silicon nanopowder (manufactured by Aldrich) and 6 parts of acetylene black (manufactured by Denki Kagaku Kogyo Co., Ltd.) were dispersed in 24 parts of acetone, the acetone was removed to prepare a silicon-containing negative electrode active material.

A slurry for a lithium ion secondary battery negative electrode obtained by mixing 8 parts of the negative electrode active material and 25 parts of the polyvinyl acetal-based resin composition was applied on a copper foil so that a film thickness after drying became 7 μm and, after drying at 80° C. for 2 hours under normal pressure, it was dried at 120° C. for 4 hours under reduced pressure to obtain a negative electrode.

Using the negative electrode thus obtained, a solution of 1 M $LiPF_6$ in ethylene carbonate:ethyl methyl carbonate=3:7 (v/v) as an electrolytic solution, and metal lithium as a counter electrode, a coin cell was prepared, and a charging and discharging test was carried out at a negative electrode capacity of 1,250 mAh/g at a speed of 0.1 C.

Example 1

Synthesis of Polyvinyl Acetal Resin Having Crosslinking Group

A 6% by weight aqueous solution of a polyvinyl alcohol resin (a degree of polymerization measured by JIS K6726: 2,600, a degree of saponification: 99.5% by mol) was prepared. Then, 670 parts of the aqueous solution was cooled to 10° C., and 4.2 parts of hydrochloric acid (concentration: 35% by weight) was added thereto.

While stirring the whole, a mixture of 5.3 parts of butyraldehyde and 2.4 parts of cinnamaldehyde was added dropwise over a period of 10 minutes and stirring was continued for 1 hour. Thereto was added 24.5 parts of hydrochloric acid (concentration: 35% by weight) was added dropwise over a period of 10 minutes. Then, the temperature was raised to 25° C. and, after stirring was continued for 30 minutes, the temperature was raised to 60° C. and the whole was stirred for 6 hours, thus performing an acetalization reaction.

The reaction mixture was neutralized with sodium carbonate and the precipitate formed was thoroughly washed with water and dried to obtain a pale yellow solid of a polyvinyl acetal resin having a crosslinking group.

The resulting polyvinyl acetal resin was dissolved in DMSO-D6, and the degree of acetalization and the degree of crosslinking group modification were determined from integral ratios on 1H-NMR. The content of the structural unit represented by the chemical formula (1) of the obtained polyvinyl acetal resin was 79% by mol, the degree of acetalization of the structural unit represented by the chemical formula (2) (R1 is an alkyl group having 3 carbon atoms) was 18% by mol, and the degree of crosslinking group modification of the structural unit represented by the chemical formula (3) (R2 is $C_6H_5CH=CH-$) was 3% by mol.

<Preparation of Crosslinked Polyvinyl Acetal Resin Film>

Eight parts of the polyvinyl acetal resin having a crosslinking group obtained as described above and 0.32 parts of 1,1-di(t-hexylperoxy)cyclohexane (Perhexa HC (manufactured by NOF Corporation)) as a polymerization initiator were dissolved in 92 parts of N-methylpyrrolidone (NMP) to prepare a solution, which was used as a polyvinyl acetal-based resin composition.

The resin composition was cast by means of a 350 μm applicator on a polyethylene terephthalate film having been subjected to a release treatment and was dried under reduced pressure at 60° C. under 0.005 MPa or less, thereby forming a film having a film thickness of 25 μm. Furthermore, the film was dried under reduced pressure at 120° C. under 0.005 MPa or less to remove NMP completely and simultaneously, a crosslinking reaction by heat was conducted to obtain a crosslinked polyvinyl acetal resin film.

For such a film, the evaluation of the above (1) to (5) was performed.

<Measurement of Charging Capacity>

Moreover, using the polyvinyl acetal resin having a crosslinking group obtained as described above, a charging and discharging test was conducted according to the above (6).

Table 1 shows the results of each evaluation test.

Example 2

Synthesis of Polyvinyl Acetal Resin Having Crosslinking Group

A polyvinyl acetal resin was obtained in the same manner except that a mixture of 4.1 parts of butyraldehyde and 5.0 parts of cinnamaldehyde was used instead of the mixture of 5.3 parts of butyraldehyde and 2.4 parts of cinnamaldehyde, in Example 1. The content of the structural unit represented by the chemical formula (1) of the obtained polyvinyl acetal resin was 79% by mol, the degree of acetalization of the structural unit represented by the chemical formula (2) (R1 is an alkyl group having 3 carbon atoms) was 16% by mol, and the degree of crosslinking group modification of the structural unit represented by the chemical formula (3) (R2 is $C_6H_5CH=CH-$) was 5% by mol.

Using the obtained polyvinyl acetal resin having a crosslinking group, a film is prepared in the same manner as described above and, for such a film, the evaluation of the above (1) to (5) was performed.

Moreover, using the obtained polyvinyl acetal resin having a crosslinking group, a charging and discharging test was conducted according to the above (6).

Table 1 shows the results of each evaluation test.

Example 3

Synthesis of Polyvinyl Acetal Resin Having Crosslinking Group

A polyvinyl acetal resin was obtained in the same manner except that a mixture of 5.8 parts of butyraldehyde and 1.1 parts of cinnamaldehyde was used instead of the mixture of 5.3 parts of butyraldehyde and 2.4 parts of cinnamaldehyde, in Example 1. The content of the structural unit represented by the chemical formula (1) of the obtained polyvinyl acetal resin was 79% by mol, the degree of acetalization of the structural unit represented by the chemical formula (2) (R1 is an alkyl group having 3 carbon atoms) was 20% by mol, and the degree of crosslinking group modification of the structural unit represented by the chemical formula (3) (R2 is $C_6H_5CH=CH-$) was 1% by mol.

Using the obtained polyvinyl acetal resin having a crosslinking group, a film was prepared in the same manner as described above and, for such a film, the evaluation of the above (1) to (5) was performed.

Moreover, using the obtained polyvinyl acetal resin having a crosslinking group, a charging and discharging test was conducted according to the above (6).

Table 1 also shows the results of each evaluation test.

Example 4

Synthesis of Polyvinyl Acetal Resin Having Crosslinking Group

A polyvinyl acetal resin was obtained in the same manner except that a mixture of 10.5 parts of butyraldehyde and 2.5 parts of cinnamaldehyde was used instead of the mixture of 5.3 parts of butyraldehyde and 2.4 parts of cinnamaldehyde, in Example 1. The content of the structural unit represented by the chemical formula (1) of the obtained polyvinyl acetal resin was 61% by mol, the degree of acetalization of the structural unit represented by the chemical formula (2) (R1 is an alkyl group having 3 carbon atoms) was 36% by mol, and the degree of crosslinking group modification of the structural unit represented by the chemical formula (3) (R2 is $C_6H_5CH=CH-$) was 3% by mol.

Using the obtained polyvinyl acetal resin having a crosslinking group, a film was prepared in the same manner as described above and, for such a film, the evaluation of the above (1) to (5) was performed.

Moreover, using the obtained polyvinyl acetal resin having a crosslinking group, a charging and discharging test was conducted according to the above (6).

Table 1 also shows the results of each evaluation test.

Comparative Example 1

Synthesis of Polyvinyl Acetal Resin Having No Crosslinking Group

A polyvinyl acetal resin (pale yellow solid) was obtained in the same manner except that butyraldehyde alone was used in an amount of 21.0 parts instead of the mixture of 5.3 parts of butyraldehyde and 2.4 parts of cinnamaldehyde, in Example 1. The content of the structural unit represented by the chemical formula (1) of the obtained polyvinyl acetal resin was 35% by mol, the degree of acetalization of the structural unit represented by the chemical formula (2) (R1 is an alkyl group having 3 carbon atoms) was 65% by mol, and the degree of crosslinking group modification of the structural unit represented by the chemical formula (3) was 0% by mol.

Using the obtained polyvinyl acetal resin having no crosslinking group, a film is prepared in the same manner as described above and, for such a film, the evaluation of the above (1) to (5) was performed.

Moreover, using the obtained polyvinyl acetal resin having no crosslinking group, a charging and discharging test was conducted according to the above (6).

Table 1 shows the results of each evaluation test.

TABLE 1

| | Example 1 | Example 2 | Example 3 |
|---|---|---|---|
| Polyvinyl acetal resin (A) | Content of structural unit (1): 79% by mol<br>Degree of acetalization of structural unit (2): 18% by mol<br>Degree of crosslinking group modification of structural unit (3): 3% by mol<br>Average degree of polymerization: 2600 | Content of structural unit (1): 79% by mol<br>Degree of acetalization of structural unit (2): 16% by mol<br>Degree of crosslinking group modification of structural unit (3): 5% by mol<br>Average degree of polymerization: 2600 | Content of structural unit (1): 79% by mol<br>Degree of acetalization of structural unit (2): 20% by mol<br>Degree of crosslinking group modification of structural unit (3): 1% by mol<br>Average degree of polymerization: 2600 |
| (1) Degree of swelling with respect to propylene carbonate electrolytic solution (%) | 1.3 | 1.2 | 2.0 |
| (2) Degree of elution with respect to propylene carbonate electrolytic solution (%) | 0.0 | 0.0 | 0 |
| (1) Degree of swelling with respect to diethyl carbonate electrolytic solution (%) | 3.0 | 2.8 | 4.3 |
| (2) Degree of elution with respect to diethyl carbonate electrolytic solution (%) | 0.0 | 0.0 | 0 |
| (1) Degree of swelling with respect to electrolytic solution of ethylene carbonate:ethyl methyl carbonate = 3:7 (v/v) (%) | 1.9 | 1.6 | 2.1 |
| (2) Degree of elution with respect to electrolytic solution of ethylene carbonate:ethyl methyl carbonate = 3:7 (v/v) (%) | 0 | 0 | 0 |
| (3) Tg (° C.) | 85.1 | 96.1 | 81.3 |
| (3) Crosslinking density (mol/cm$^3$) | $1.26 \times 10^{-4}$ | $4.08 \times 10^{-4}$ | $2.56 \times 10^{-5}$ |
| (4) Elastic modulus in propylene carbonate electrolytic solution swollen state (GPa) | 2.71 | 2.78 | 2.60 |
| (4) Elastic modulus in diethyl carbonate electrolytic solution swollen state (GPa) | 2.64 | 2.69 | 1.31 |
| (5) Tensile permanent strain in diethyl carbonate electrolytic solution swollen state (%) | 2.9 | 2.2 | 6.2 |
| (6) Charging capacity after 15 cycles of charging and discharging test (mAh/g) | 1,250 | 1,250 | 1,250 |

TABLE 1-continued

| | Example 4 | Comparative Example 1 |
|---|---|---|
| Polyvinyl acetal resin (A) | Content of structural unit (1): 61% by mol<br>Degree of acetalization of structural unit (2): 36% by mol<br>Degree of crosslinking group modification of structural unit (3): 3% by mol<br>Average degree of polymerization: 2600 | Content of structural unit (1): 35% by mol<br>Degree of acetalization of structural unit (2): 65% by mol<br>Degree of crosslinking group modification of structural unit (3): 0% by mol<br>Average degree of polymerization: 2600 |
| (1) Degree of swelling with respect to propylene carbonate electrolytic solution (%) | 5.7 | 6.2 |
| (2) Degree of elution with respect to propylene carbonate electrolytic solution (%) | 0 | 1.8 |
| (1) Degree of swelling with respect to diethyl carbonate electrolytic solution (%) | 15.3 | 46.5 |
| (2) Degree of elution with respect to diethyl carbonate electrolytic solution (%) | 0 | 2.2 |
| (1) Degree of swelling with respect to electrolytic solution of ethylene carbonate:ethyl methyl carbonate = 3:7 (v/v) (%) | 19 | 47.5 |
| (2) Degree of elution with respect to electrolytic solution of ethylene carbonate:ethyl methyl carbonate = 3:7 (v/v) (%) | 0 | 2 |
| (3) Tg (° C.) | 86.7 | 75.1 |
| (3) Crosslinking density (mol/cm$^3$) | $1.28 \times 10^{-4}$ | — |
| (4) Elastic modulus in propylene carbonate electrolytic solution swollen state (GPa) | 1.90 | 1.76 |
| (4) Elastic modulus in diethyl carbonate electrolytic solution swollen state (GPa) | 0.56 | 0.12 |
| (5) Tensile permanent strain in diethyl carbonate electrolytic solution swollen state (%) | 6.9 | broken |
| (6) Charging capacity after 15 cycles of charging and discharging test (mAh/g) | 1,169 | 25 |

Examples 1 to 4 use the binders for an electrode of the present invention. They use polyvinyl acetal resins (A) having a crosslinking group as binding resins and it is revealed that the degree of swelling and the degree of elution with regard to propylene carbonate and diethyl carbonate are both decreased by crosslinking the resins. In the case where propylene carbonate is used as an electrolytic solution, in Examples 1 and 2, the degree of swelling was suppressed to about 20% of that in the case where the uncrosslinked resins were used, and was suppressed to about 30% in Example 3 and to about 90% in Example 4. As for the degree of elution, a very excellent result of 0% was obtained. Furthermore, in the case where diethyl carbonate was used as an electrolytic solution, in Examples 1 and 2, the degree of swelling was suppressed to about 6% of that in the case where the uncrosslinked resins were used, and was suppressed to about 9% in Example 3 and to about 30% in Example 4. As for the degree of elution, a very excellent result of 0% was obtained.

Moreover, the elastic modulus of the films swollen with propylene carbonate or diethyl carbonate became high.

When Examples 1 to 3 are compared, there was obtained a result that the degree of electrolytic solution swelling decreases as the degree of crosslinking group modification of the structural unit (3) increases even when the content of the structural unit (1) is the same. Moreover, when Example 1 and Example 4 are compared, there was obtained a result that the degree of electrolytic solution swelling decreases as the content of the structural unit (1) increases even when the degree of crosslinking group modification of the structural unit (3) is the same.

Furthermore, in the repeated tensile test of the films swollen with diethyl carbonate, the tensile permanent strain was small, for example, from 2.2% to 6.9% in Examples 1 to 4. In Comparative Example 1, since the film is broken during the test, it is revealed that the strain is more accumulated than in Examples 1 to 4, the film cannot sufficiently be contracted and cannot continue to follow expansion and contraction even when they are repeated. From the results, it is obvious that, in Examples 1 to 4, the films can sufficiently expand and contract and can continue to follow expansion and contraction even when they are repeated.

As above, in every evaluation, it is revealed that more excellent effects are obtained in the case where the resin having large crosslinking group content and high crosslinking density of Example 2 is used.

When Examples 1 to 3 are compared, there was obtained a result that the elastic modulus in the electrolytic solution swollen state increases and the tensile permanent strain in the diethyl carbonate swollen state decreases as the degree of crosslinking group modification of the structural unit (3) increases even when the content of the structural unit (1) is the same. Moreover, when Example 1 and Example 4 are compared, the crosslinking density can made equal when the degree of crosslinking group modification of the structural unit is the same but, in this occasion, there was obtained a result that the elastic modulus in the electrolytic solution swollen state increases and the tensile permanent strain in the diethyl carbonate swollen state decreases as the amount of the structural unit (1) increases.

Moreover, in the charging and discharging test, in coin cells of Examples 1 to 4, a charging capacity of 1,150 mAh/g or more is shown even after 15 cycles of charging and discharging and it is revealed that the binders containing each of the resins of the invention can follow the expansion/contraction of the negative active material resulting from repeated charging and discharging in every case.

Incidentally, upon the evaluation of the performance of the binder for an electrode, it is possible to evaluate a higher level performance difference by evaluating the binder binding resin itself rather than by evaluating the state that the electrode, i.e., the active material and the binding resin are coexisted. It is obviously revealed that the binder for a lithium ion secondary battery electrode of the invention is a binder having an extremely excellent performance, through evaluating the degree of elution, the degree of swelling, tensile permanent strain, and the like of the binder binding resin itself. Therefore, it is obvious that the electrode obtained using the binder for a lithium ion secondary battery electrode of the invention and the lithium ion secondary battery using the electrode can be stably used for a long period of time and the discharging capacity retention resulting from the charging and discharging cycle is satisfactory.

While the invention has been described in detail and with reference to specific embodiments thereof, it will be apparent to one skilled in the art that various changes and modifications can be made therein without departing from the spirit and scope of the invention. The present application is based on Japanese Patent Application No. 2013-184830 filed on Sep. 6, 2013, and the contents are incorporated herein by reference.

INDUSTRIAL APPLICABILITY

The binder for a lithium ion secondary battery electrode of the invention has a low degree of elution and a low degree of swelling with respect to a carbonate ester-based electrolytic solution and shows good adhesive properties. Therefore, the binder is useful as a binder for a lithium ion secondary battery electrode for obtaining a lithium ion secondary battery having good battery characteristics.

The invention claimed is:

1. A binder for a lithium ion secondary battery electrode, which comprises a polyvinyl acetal-based resin (A) containing structural units represented by chemical formulae (1) to (3):

[Chem 1]

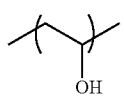

(1)

[Chem 2]

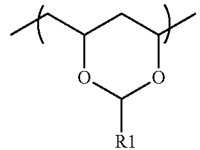

(2)

wherein R1 is a hydrogen atom or an alkyl group having 1 to 10 carbon atoms, and

[Chem 3]

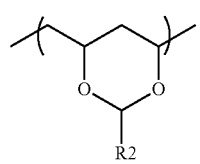

(3)

wherein R2 is a functional group containing an ethylenically unsaturated bond.

2. The binder for a lithium ion secondary battery electrode according to claim 1, wherein, in the polyvinyl acetal-based resin (A), the degree of acetalization of the structural unit represented by the formula (2) is from 10 to 40% by mol.

3. The binder for a lithium ion secondary battery electrode according to claim 1, wherein, in the polyvinyl acetal-based resin (A), the degree of crosslinking group modification of the structural unit represented by the formula (3) is from 0.1 to 15% by mol.

4. The binder for a lithium ion secondary battery electrode according to claim 1, wherein, in the polyvinyl acetal-based resin (A), the content of the structural unit represented by the formula (1) is from 45 to 89.9% by mol.

5. The binder for a lithium ion secondary battery electrode according to claim 1, wherein the average degree of polymerization of the polyvinyl acetal-based resin (A) is 1,500 or more.

6. The binder for a lithium ion secondary battery electrode according to claim 1, which contains a solvent (B).

7. The binder for a lithium ion secondary battery electrode according to claim 1, which contains a polymerization initiator (C).

8. A method for producing a lithium ion secondary battery electrode, which comprises forming an electrode on a collector using the binder for a lithium ion secondary battery electrode according to claim 1 and crosslinking the polyvinyl acetal-based resin (A) by heat or light.

9. A lithium ion secondary battery electrode comprising the binder for a lithium ion secondary battery electrode according to claim 1 and an active material.

10. The lithium ion secondary battery electrode according to claim 9, wherein the polyvinyl acetal-based resin (A) contained in the binder for a lithium ion secondary battery electrode is from 0.1 to 10 parts by weight based on 100 parts by weight of the active material.

11. A lithium ion secondary battery electrode comprising a crosslinked product of a polyvinyl acetal-based resin (A) containing structural units represented by chemical formulae (1) to (3):

[Chem 4]

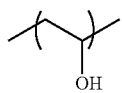
(1)

[Chem 5]

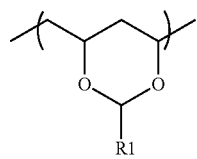
(2)

wherein R1 is a hydrogen atom or an alkyl group having 1 to 10 carbon atoms, and

[Chem 6]

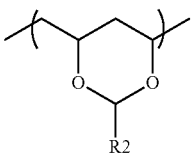
(3)

wherein R2 is a functional group containing an ethylenically unsaturated bond.

12. A lithium ion secondary battery having the lithium ion secondary battery electrode according to claim 9.

13. A lithium ion secondary battery having the lithium ion secondary battery electrode according to claim 11.

* * * * *